(12) United States Patent
Schad et al.

(10) Patent No.: US 8,087,919 B2
(45) Date of Patent: Jan. 3, 2012

(54) INJECTION UNIT FOR AN INJECTION MOLDING MACHINE

(75) Inventors: Robert D. Schad, Toronto (CA); Carsten Link, Burlington (CA); Franz Strohmaier, Guelph (CA)

(73) Assignee: Athena Automation Ltd., Woodbridge (CA)

(*) Notice: Subject to any disclaimer, the term of this patent is extended or adjusted under 35 U.S.C. 154(b) by 68 days.

(21) Appl. No.: 12/788,877

(22) Filed: May 27, 2010

(65) Prior Publication Data

US 2010/0303949 A1 Dec. 2, 2010

Related U.S. Application Data

(60) Provisional application No. 61/181,723, filed on May 28, 2009.

(51) Int. Cl.
*B29C 45/80* (2006.01)

(52) U.S. Cl. .................. 425/145; 425/149; 425/542

(58) Field of Classification Search .................. 425/145, 425/149, 542
See application file for complete search history.

(56) References Cited

U.S. PATENT DOCUMENTS

| | | | |
|---|---|---|---|
| 2,671,247 A * | 3/1954 | Lester | 425/149 |
| 4,192,616 A | 3/1980 | Spanier | |
| 5,540,495 A | 7/1996 | Pickel | |
| 6,478,572 B1 | 11/2002 | Schad | |
| 7,112,056 B2 | 9/2006 | Ickinger | |
| 7,316,553 B2 | 1/2008 | Teng et al. | |
| 7,357,065 B2 | 4/2008 | Mitsui | |
| 7,390,185 B2 | 6/2008 | Teng et al. | |

FOREIGN PATENT DOCUMENTS

| | | |
|---|---|---|
| GB | 1094037 | 4/1914 |
| GB | 2119441 | 11/1983 |
| JP | 3-270921 | * 12/1991 |
| WO | 2003046388 | 6/2003 |
| WO | 2005080817 | 9/2005 |

* cited by examiner

*Primary Examiner* — Timothy Heitbrink
(74) *Attorney, Agent, or Firm* — Bereskin & Parr LLP/S.E.N.C.R.L., s.r.l.

(57) ABSTRACT

An injection drive unit includes a hollow cylindrical casing rotatably supported by a housing, the cylindrical casing having an axis and a front end and a back end spaced apart along the axis; a piston in the cylindrical casing, the piston axially slidable relative to the cylindrical casing along the axis between advanced and retracted positions, and the piston rotationally locked with the cylindrical casing to rotate therewith; and a cylinder cap generally closing off the back end of the cylindrical casing and providing a first pressure chamber between the piston and the cylinder cap, the cylinder cap including a stationary part affixed to the housing and a rotary part affixed to the cylindrical casing, at least the stationary part providing a stationary end face opposed to the piston and against which fluid in the first pressure chamber bears when pressurized.

18 Claims, 11 Drawing Sheets

INJECTION UNIT FOR AN INJECTION MOLDING MACHINE

This application claims the benefit of Provisional Application Ser. No. 61/181,723, filed May 28, 2009, which is hereby incorporated herein by reference.

FIELD

The teaching disclosed herein generally relates to one or more methods and apparatuses associated with plasticizing and injecting mold material into a mold of an injection molding machine.

BACKGROUND

U.S. Pat. No. 5,540,495 (Pickel) discloses an extruder screw drive has a first and a second motor, a screw mechanism connected to the first motor and to the extruder screw for translating it in the extrusion cylinder, and a slide mechanism connected to the second motor and to the extruder screw for rotating it in the extrusion cylinder. The screw mechanism and the slide mechanism are coaxial and partially fit into one another to provide an axially compact arrangement. The motors can be hollow shaft electric motors axially aligned together, and pressure regulated hydraulic axial force can be added to the extruder screw during plasticating as it retracts due to increased volume of plastic at an output end of the extrusion cylinder.

U.S. Pat. No. 7,390,185 (Teng et al.) discloses a drive unit operable to translate and rotate a shaft, the drive unit including: (i) a hollow electric motor having a rotor, (ii) a fluid cylinder, (iii) means for connecting the shaft to the rotor of the hollow electric motor, (iv) means permitting the shaft to move lengthwise coupled with the fluid cylinder, and (iv) means connecting the fluid cylinder to the shaft, whereby the shaft may be rotated by the hollow electric motor and moved lengthwise by the fluid cylinder, and wherein the fluid cylinder has an outer wall coupled with the rotor of the hollow electric motor.

Great Britain Pat. No. 1,094,037 (Zdarske) discloses an axially reciprocable injection screw connected to a cylinder which co-operates with a fixed piston and is rotatable by a drive motor which is axially fixed with respect to the movable cylinder. The drive motor may be an electric motor or an hydraulic motor comprising a rotor and stator. The screw is advanced axially by fluid pressure introduced between the piston and cylinder through a pipe. By unscrewing plugs in the cylinder and piston respectively the screw can be withdrawn for servicing.

SUMMARY

The following summary is intended to introduce the reader to the disclosure provided herein but not to define any invention. In general, this disclosure describes one or more methods or apparatuses related to injection molding, and to rotating and translating an injection screw for injecting resin or another injection material into the mold. Some aspects of the invention provide an injection unit that has a piston for axially translating an injection screw, the piston housed in a cylinder casing which is urged to rotate by a rotary drive. The cylinder casing is rotationally locked with the piston so that the piston (with injection screw attached thereto) rotates with the cylinder casing. The cylinder can have a cylinder cap, and a pressure chamber can be provided between the cylinder cap and the piston. At least a portion of the cylinder cap is stationary, and provides a stationary end face relative to which the cylindrical casing rotates, and against which fluid in the chamber bears when pressurized.

Some aspects of the present invention relate to a rotary drive in the form of a hollow motor, in which a non-rotary housing is disposed about a hollow cylindrical casing which rotates about its axis. The housing serves as the stator and can include motor windings mounted adjacent an inner surface of the housing facing the cylindrical casing. The cylindrical casing is the rotor, and can include magnets mounted adjacent its outer surface. A piston is slidably mounted in cylindrical casing and rotationally locked to the casing to rotate therewith. The piston can be coupled to an injection screw for rotating and translating the screw during an injection molding cycle.

Some aspects of the present invention relate to methods and apparatuses for providing fluid communication with a second pressure chamber separated from a first pressure chamber by a piston member. The first and second pressure chambers can be housed within a cylindrical casing, and the piston can translate axially within the casing between advanced and retracted positions. An end cap (or cylinder cap) can generally close off one end of the cylindrical casing, and the first pressure chamber can be disposed between the cylinder cap and a first face of the piston directed towards the end cap. A fluid conduit can extend between the end cap and the piston, through the first pressure chamber, for providing fluid communication from outside the cylindrical casing to the second pressure chamber. The fluid conduit can be a tube extending coaxially with the cylindrical casing, and the tube can be cylindrical in cross section. The tube can be fixed to the end cap, and the piston can have a bore therethrough, the bore receiving the tube in sliding fit as the piston travels between the advanced and retracted positions.

According to one or more aspects, disclosed is an injection unit, comprising: a hollow cylindrical casing rotatably supported by a housing, the cylindrical casing having an axis and a front end and a back end spaced apart along the axis; a piston in the cylindrical casing, the piston axially slidable relative to the cylindrical casing along the axis between advanced and retracted positions, and the piston rotationally locked with the cylindrical casing to rotate therewith; and a cylinder cap generally closing off the back end of the cylindrical casing, a first pressure chamber provided between a first face of the piston and the cylinder cap, the cylinder cap including a stationary part affixed to the housing and a rotary part affixed to the cylindrical casing, at least the stationary part providing a stationary end face opposed to the piston and against which fluid in the first pressure chamber bears when pressurized.

In some examples, the stationary part can be separately attachable to the housing. In some examples, the rotary part can be separately attachable to the cylindrical casing. The rotary part can have a central opening therethrough, the opening defined by a generally cylindrical radially inner surface of the rotary part that is coaxial with the axis of the casing and comprises a rotary seal surface. The stationary part can have a generally cylindrical radially outer surface defining a stationary seal surface. The stationary seal surface can be received in sliding fit within the rotary seal surface. The injection unit can include at least one seal disposed between, and in sealing engagement with, the rotary and stationary seal surfaces In some examples, the first pressure chamber can have a first bore diameter defined by an inner surface of the cylindrical casing along which the piston slides when moving between the advanced and retracted positions. The stationary end face can have an outer diameter generally equal to the first bore diameter. In some examples, the stationary end face has an outer diameter less than the first bore diameter.

The rotary part can have a generally annular rotary end face directed towards the piston and against which fluid in the first pressure chamber can bear when pressurized, the rotary end face extending radially between the outer diameter of the stationary end face and the first bore diameter. The injection unit can have at least one first flow port in the cylinder cap for fluid flow into and out of the first pressure chamber. The at least one first flow port can be in the stationary part of the cylinder cap.

The injection unit can include bearings mounted between the housing and the cylindrical casing. At least a portion of the axial force of pressure in chamber can be transferred to the housing through the cylinder cap without passing through the bearings.

In some examples, the piston can be rotationally locked to the cylindrical casing to rotate with the cylindrical casing when in and moving between the advanced and retracted positions. The injection unit can further include a second pressure chamber acting against a second face of the piston, opposite the first chamber. The first face of the piston can have a first piston face surface area acted on by fluid in the first pressure chamber, and the second face of the piston has a second piston face surface area acted on by fluid in the second pressure chamber, wherein the first piston face surface area is greater than the second piston face surface area.

In some examples, the injection unit can include a suckback fluid passageway providing fluid communication between a second port in the cylinder cap and the second pressure chamber. The second port can be provided in the stationary part of the cylinder cap. The suckback fluid passageway can include an axial portion and one or more radial portions. The axial portion of the suckback fluid passageway can comprise a fluid conduit extending between the second port and the piston. The fluid conduit can comprise a generally straight cylindrical tube, coaxial with the cylindrical casing and connecting the second port in the cylinder cap with a hollow interior portion of the piston body. At least a portion of the fluid conduit can extend through the first pressure chamber. The fluid conduit can be fixed relative to the stationary part of the cylinder cap. The piston can rotate and/or translate relative to the fluid conduit. The one or more radial portions can comprise ducts in the piston body providing fluid communication between the hollow interior of the piston body and the second pressure chamber. In some examples, the fluid conduit can be fixed relative to the piston, and the fluid conduit can rotate and translate relative to the stationary part of the cylinder cap.

The injection unit can, in some examples, include a rotary drive coupled to the cylindrical casing for rotating the casing. The rotary drive can comprise an electric motor. In some examples, the rotary drive can comprise a hollow electric motor having a stator and a rotor, wherein the cylindrical casing comprises the rotor.

According to some aspects of the teaching disclosed herein, an injection unit comprises a hollow cylindrical casing rotatably supported by a housing, the cylindrical casing having an axis and a front end and a back end spaced apart along the axis; a piston in the cylindrical casing, the piston axially slidable relative to the cylindrical casing along the axis between advanced and retracted positions; and a cylinder cap having a bearing face generally closing off the back end of the hollow cylindrical casing and facing the piston, the hollow cylindrical casing having a first pressure chamber between the piston and the bearing face, the bearing face including at least a stationary face portion affixed to the housing and against which fluid in the first pressure chamber bears, the hollow cylindrical casing rotatable about the axis relative to the housing and the stationary face portion of the bearing face.

In some examples, the cylinder cap can comprise a stationary part affixed to the housing. The stationary part can have a stationary end face directed towards the piston, and the stationary face portion of the bearing face can comprise the stationary end face. The stationary part can be separately attachable to the housing. The cylinder cap can further comprise a rotary part affixed to the hollow cylindrical casing. The rotary part can be separately attachable to the hollow cylindrical casing. The rotary part can have a generally cylindrical radially inner surface defining a rotary seal surface. The stationary part can have a generally cylindrical radially outer surface defining a stationary seal surface. The stationary seal surface can be received in sliding fit within the rotary seal surface. At least one seal can be disposed between, and in sealing engagement with, the rotary and stationary seal surfaces.

According to some aspects, an actuator for an injection unit of an injection molding machine includes: a cylinder including a hollow cylindrical casing having a cylinder axis, and a cylinder cap generally closing off one end of the cylindrical casing; a piston translatable within the cylinder along the cylinder axis between advanced and retracted positions, at least the piston being rotatable about the cylinder axis; the cylinder comprising a first pressure chamber on a first side of the piston facing the cylinder cap for urging the piston in a first direction when pressurized, and the cylinder comprising a second pressure chamber on a second side of the piston opposite the first side for urging the piston in a second direction when pressurized, the second direction opposite the first direction; and a fluid conduit extending between the cylinder cap and the piston and generally through the first pressure chamber for fluid communication with the second pressure chamber.

In some examples, the fluid conduit can comprise a generally cylindrical tube coaxial with the cylinder axis. The cylindrical casing can be rotationally locked with the piston and rotates about the cylinder axis with the piston. In some examples, one of the piston and the cylinder cap can be axially moveable relative to the tube. In some examples, one of the piston and the cylinder cap can be rotationally moveable relative to the tube. In some examples, the tube can be fixed relative to the cylinder cap.

The piston can comprise an axial through-hole that receives the tube therethrough in sealed, sliding engagement. The piston can include a piston body, and the piston body can have a hollow interior cavity for telescopically receiving the tube when the piston moves towards the retracted position.

In some examples, the second pressure chamber can comprise an annular space between an outer surface of the piston body and an inner surface of the casing, and the piston can include radial flow channels extending between the interior cavity and the second pressure chamber. The outer surface of the piston body can have an external spline profile, and the actuator can comprise a spline nut fixed to the casing and having an corresponding internal spline profile for coupling with the external spline profile in an axially slidable, rotationally locked fit.

In some examples, the cylinder cap can have a first port therethrough for fluid communication with first pressure chamber. The cylinder cap can have a second port therethrough for fluid communication with the tube. The cylinder cap can have a stationary part relative to which the casing rotates, the first port and the second port provided in the stationary part of the cylinder cap. The stationary part of cylinder cap can have a stationary end face against which fluid in the first pressure chamber bears when pressurized. The actuator can further comprise a housing for rotatably supporting the casing.

According to some aspects, an injection unit for an injection molding machine comprises: a hollow electric motor including a stator and a rotor, the rotor rotatable about an axis; and a piston mounted within the rotor and slidable along the axis between advanced and retracted positions, the piston splined to the rotor to rotate with the rotor, the piston having a piston seal disposed between, and in sealed engagement with, an outer surface of the piston and an inner surface of the rotor.

According to some aspects, an injection unit for an injection molding machine comprises: a hollow cylindrical casing rotatably supported by a housing, the cylindrical casing having an axis and a front end and a back end spaced apart along the axis; a piston in the cylindrical casing, the piston axially slidable relative to the cylindrical casing along the axis between advanced and retracted positions, and the piston rotationally locked with the cylindrical casing to rotate therewith; and rotor components affixed to the cylindrical casing so that the cylindrical casing is the rotor of a hollow electric motor.

In some examples, the rotor components can comprise magnets mounted adjacent an outer surface of the cylindrical casing. The injection unit can further comprise stator components affixed to the housing so that the housing is the stator of the hollow electric motor. The stator components can comprise motor windings mounted to the housing about an outer surface of the rotor. The piston can have at least one piston seal mounted about its periphery, and wherein the cylindrical housing has an inner surface wiped by the piston seal when the piston moves between the advanced and retracted positions. The cylindrical casing can have a wall with a thickness extending between the inner surface and the outer surface, the wall being of integral, unitary construction across the wall thickness.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. The applicants, inventors and/or owners contend that any invention disclosed in an apparatus or process described below that is not claimed in this document may be protected in one or more other applications, for example in a continuing application, and that they do not intend to abandon, disclaim or dedicate to the public any such invention by its disclosure in this document.

Figure 1:
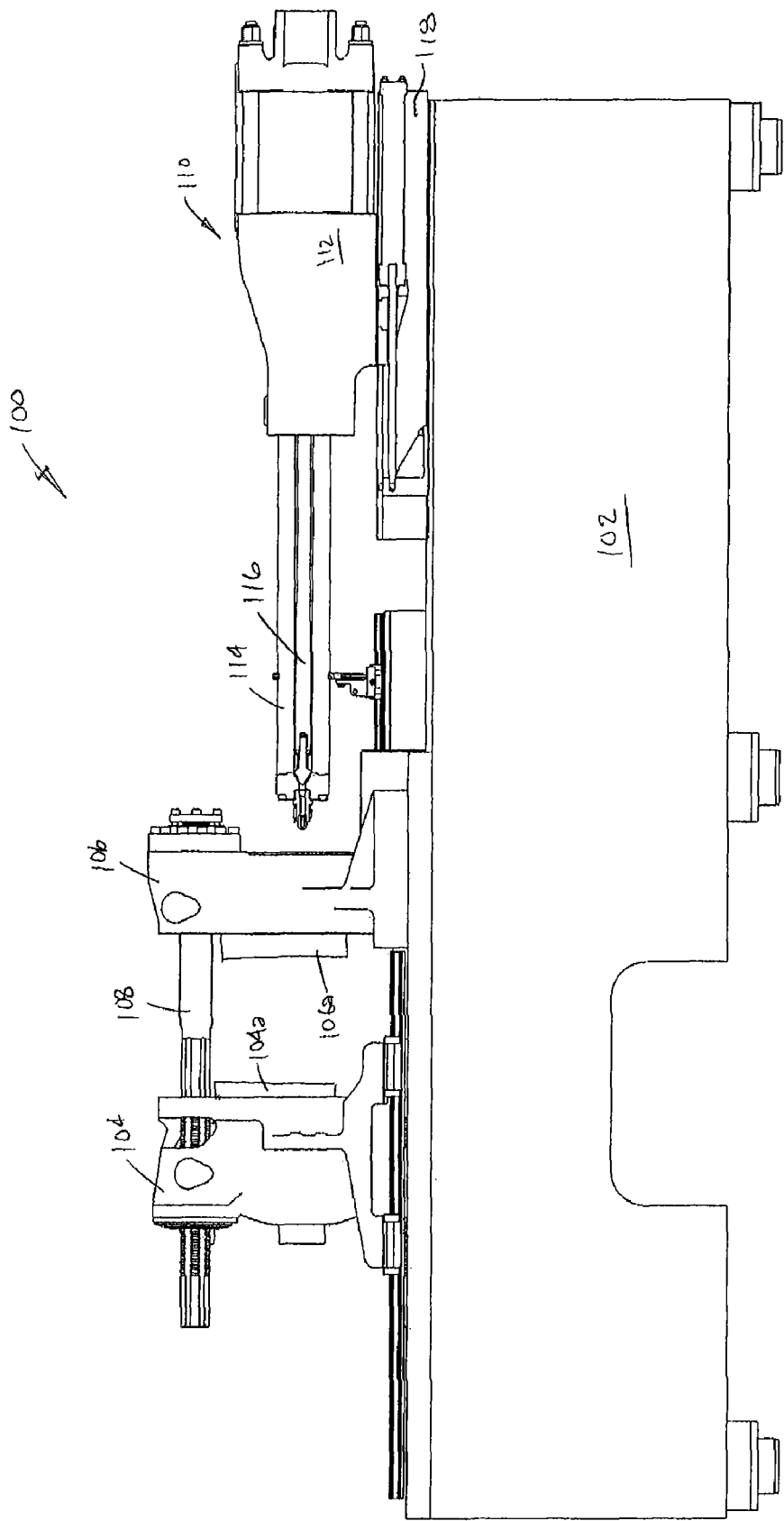
FIG. 1 is an elevation view of an injection molding machine.

Referring to FIG. 1, an example of an injection molding machine 100 includes a base 102, with a moving platen 104 and a stationary platen 106 mounted to the base 102 and coupled together via tie bars 108. A mold is formed between the platens 104, 106, the mold defined at least in part by a first mold half 104a mounted to the moving platen 104, and a second mold half 106a mounted to the stationary platen 106.

An injection unit 110 is mounted to the base 102 for injecting resin or other mold material into the mold 104a, 106a to form a molded article. The injection unit 110 generally includes a housing 112 and a barrel 114 extending from the housing 112 towards the mold 104a, 106a. An injection screw 116 is housed within the barrel 114. The housing 112 can be mounted on a carriage slide 118 for advancing the barrel 114 towards, and retracting the barrel 114 from, the mold 104a, 106a.

Figure 2:
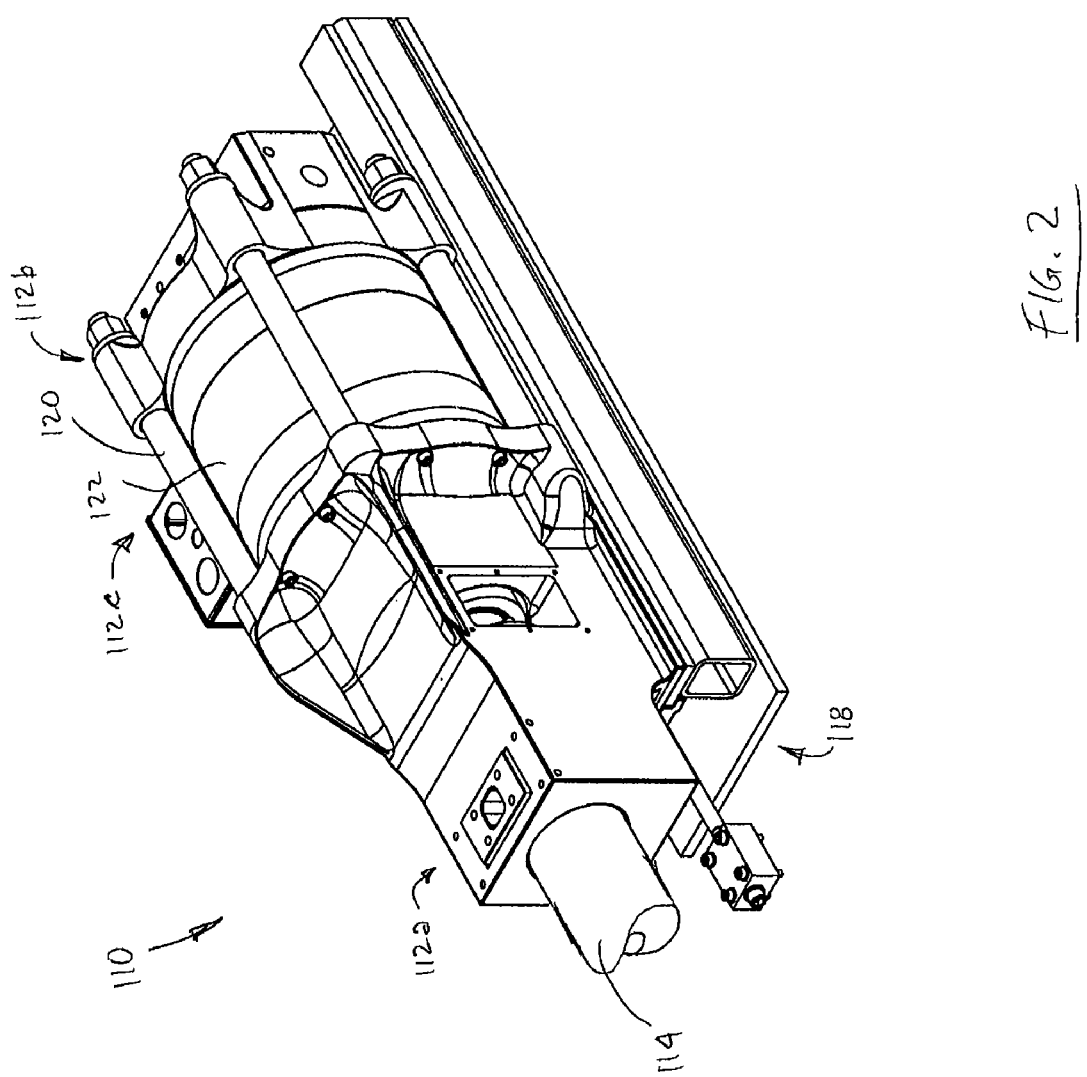
FIG. 2 is a perspective view of the injection unit of the machine of FIG. 1.

Referring to FIG. 2, the injection unit 110 in the example illustrated has a housing 112 with a first (front) portion 112a proximate the barrel 114, a second (back) portion 112b distal the barrel 114, and a third (intermediate) portion 112c between the front and back portions 112a, 112b. The intermediate portion 112c can include load bearing tie rods 120 connecting together the front and back portions 112a, 112b. The intermediate portion 112c further includes, in the example illustrated, an outer shell 122 extending between the front and back portions 112a, 112b.

Figure 3:
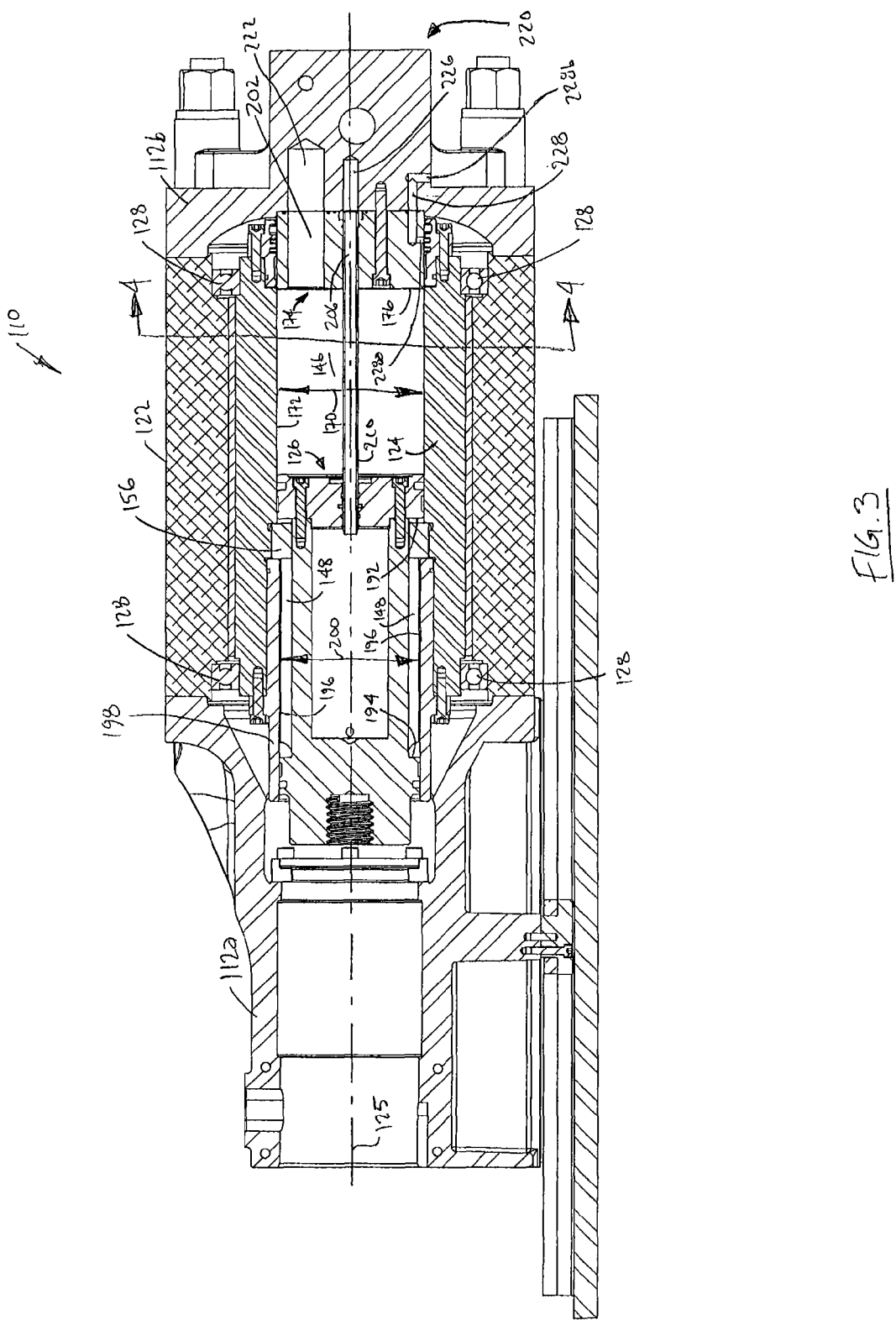
FIG. 3 is a cross-sectional view of the unit of FIG. 2.

As seen in FIG. 3, the injection unit 110 includes a hollow cylindrical casing 124 rotatably supported by the housing 112. A piston 126 is mounted in the casing 124 for rotating and translating the injection screw 116.

Bearings 128 can be mounted between the casing 124 and the housing 112 to facilitate rotation of the casing 124 relative to the housing 112. In the example illustrated, the bearings 128 are mounted between the cylindrical casing 124 and the outer shell 122 of the intermediate portion 112c of the housing 112.

Figure 4:
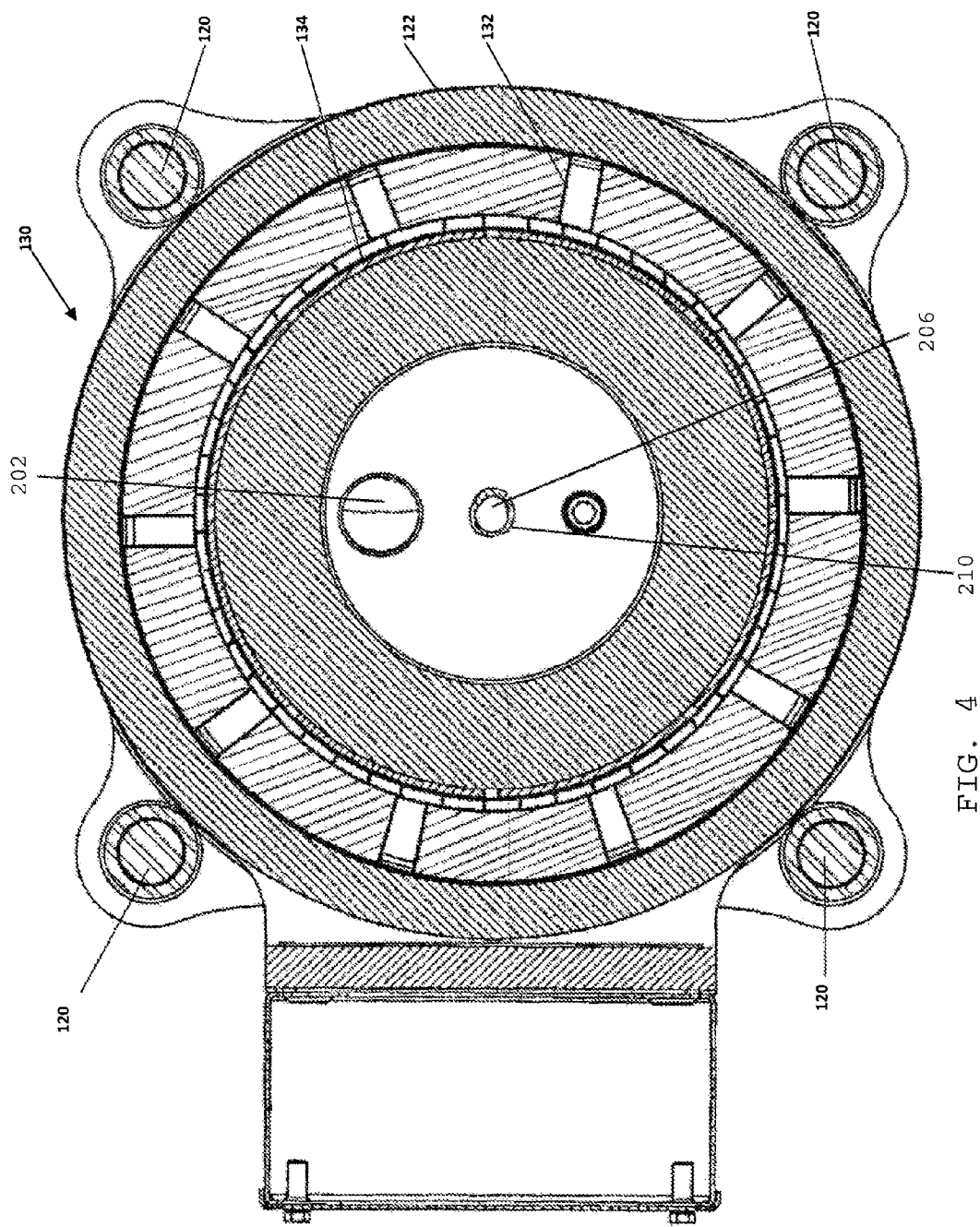
FIG. 4 is a cross-sectional view of the unit of FIG. 3, taken along the lines 4-4.

As seen in FIG. 4, a rotary drive 130 can be provided for rotating the casing 124. The rotary drive 130 can comprise a motor. In the example illustrated, the rotary drive 130 comprises a hollow electric motor, with stator components (e.g. windings) 132 built into the outer shell 122 of the housing 112, and rotor components (e.g. magnets) 134 built into the cylindrical casing 124.

Figure 5:
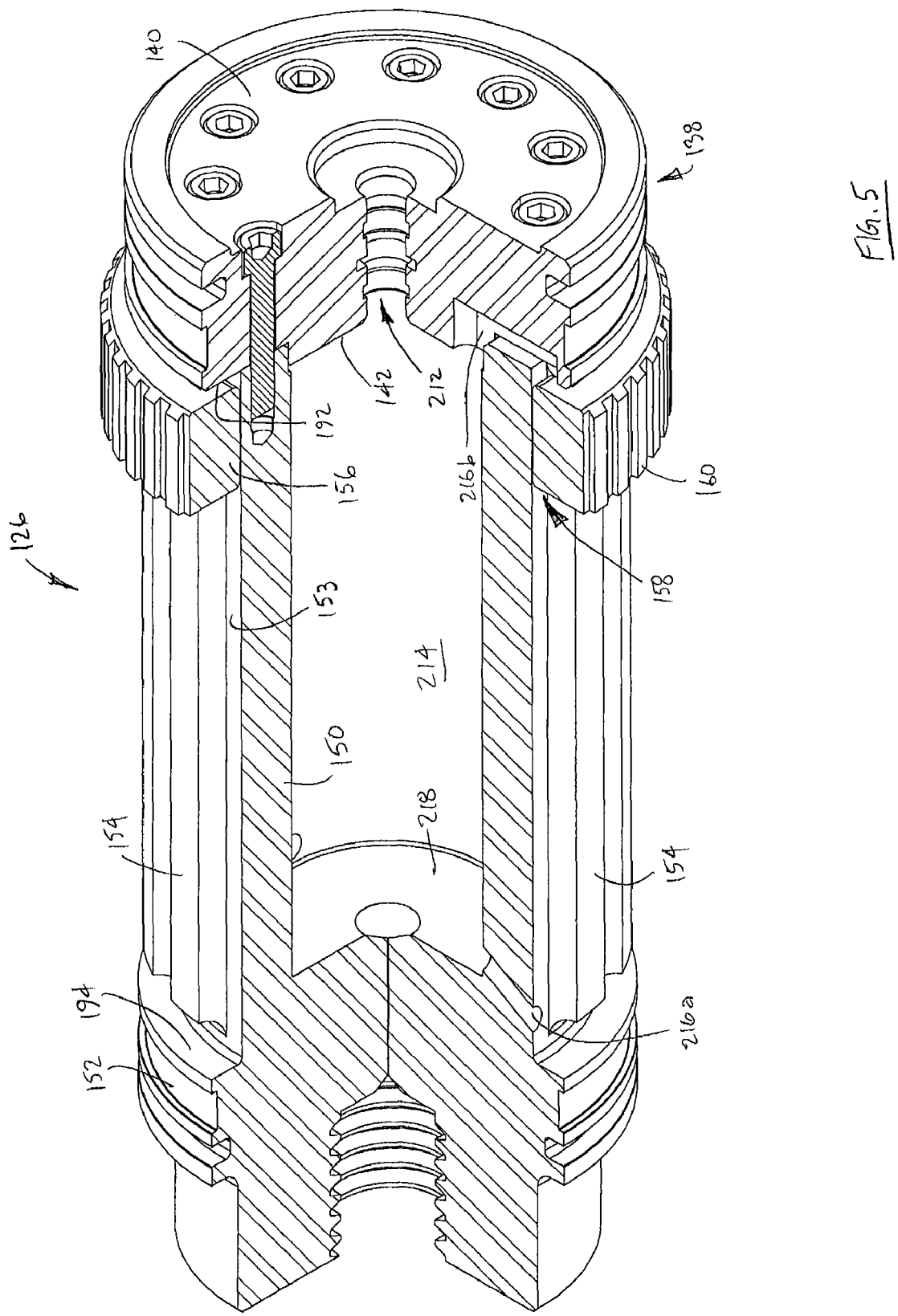
FIG. 5 is an enlarged partially sectioned perspective view of a piston portion of the unit of FIG. 2.
Figure 6:
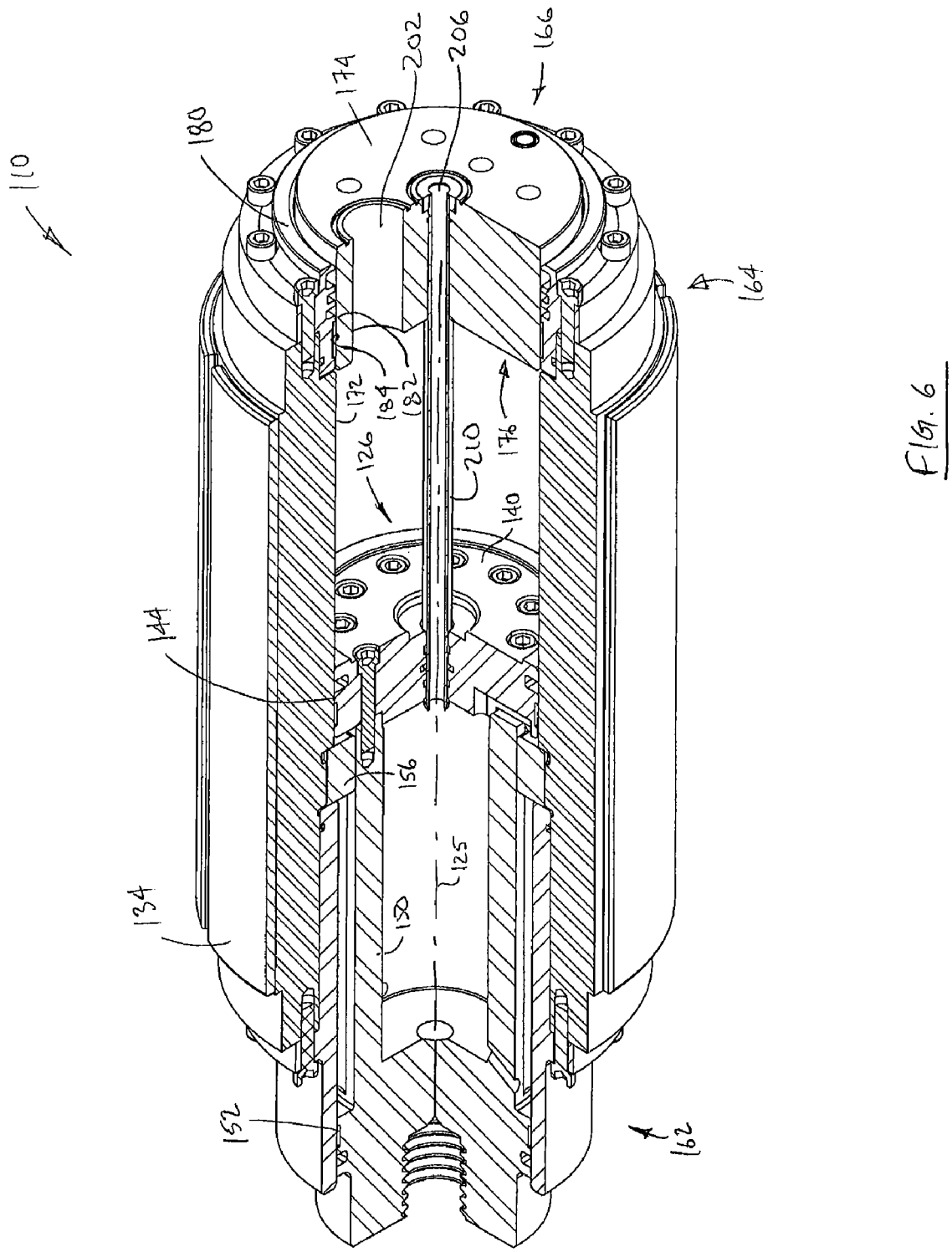
FIG. 6 is an enlarged partially sectioned perspective view showing cylinder and piston portions of the unit of FIG. 2.

Referring also to FIG. 5, the piston 126 is rotationally locked with the cylindrical casing 124 such that the piston 126 rotates with the casing 124. In the example illustrated, the piston 126 includes a piston head 138 with axially opposed first and second faces 140, 142, the first face 140 disposed rearwardly of the second face 142. At least a portion of a radially outer surface extending between the first and second faces 140, 142 defines a first seal journal 144 (FIG. 6). The first seal journal 144 generally separates an interior volume of the cylindrical casing 124 into a first pressure chamber 146 (on the back, first-face side of the piston head 138) and a second pressure chamber 148 (on the front, second-face side of the piston head 138) (FIG. 3).

The piston 126 further includes a generally cylindrical body portion 150 extending axially from the second face 142 of the piston head 138, away from the first face 140. A second seal journal 152 is provided adjacent a front end of the piston body 150 spaced axially apart from the first seal journal 144. The outer surface 153 of the body 150 is provided with an external spline profile 154. A spline nut 156 having an internal spline profile 158 is fixed to the casing 124. The spline nut 156 receives the external spline profile 154 of the piston body 150 in an axially sliding, rotationally locked, fit. The spline nut 156 can mate with a corresponding surface along a portion of the inner wall of the casing 124 to fix the spline nut 156 to the casing 124.

Locking the piston 126 to rotate with the casing 124 can facilitate sealing the first seal journal 144 against the inner wall of the casing 124. The frictional loads required to provide a reliable fluid tight seal can be reduced, since the opposed surfaces forming the seal interface move only in an axial direction relative to each other, rather than in both an axial and rotational direction. Reduced frictional loads can provide increased service life of the seal, and can reduce energy consumption of the machine when translating the piston 126 during use.

Referring now to FIGS. 3 and 6, the cylindrical casing 124 has an axis 125 along which it extends, and a front end 162 and a back end 164 spaced apart along the axis 125. A cylinder cap 166 is provided for closing off the back end 164 of the hollow cylindrical casing 124. The first pressure chamber 146 is provided in the casing 124 between the piston 126 and the cylinder cap 166. The cylinder cap 166 has a bearing face generally orthogonal to the axis 125 and directed towards the rear face 140 of the piston head 138. The first pressure chamber 146 has a first bore diameter 170 generally defined by the inner surface 172 of the cylindrical casing 124 engaged by the first seal journal 144 when the piston 126 travels between advanced and retracted positions. In the example illustrated, the bearing face of the cylinder cap 166 (i.e. the whole surface of the cylinder cap 166 against which pressure in the first pressure chamber 146 exerts an axial force) has an outer diameter generally equal to the first bore diameter 170.

The cylinder cap 166 includes at least a first part (also called a stationary part) 174 affixed to the housing 112. In the example illustrated, the back portion 112*b* of the housing 112 provides an end cover that generally closes off the back end of the housing 112 (i.e. closes off the back end of the outer shell 122). The stationary part 174 of the cylinder cap 166 is, in the example illustrated, a distinct element separately attached to the back end 112*b* of the housing 112. In other examples, the stationary part 174 can be affixed to the housing 112 by being formed integrally therewith.

The stationary part 174 has a stationary end face 176 directed towards the piston 126. The hollow cylindrical casing 124 rotates about the axis 125 relative to the stationary end face 176 and to the housing 112, to which the stationary part 174 is affixed. The stationary end face 176 forms a portion of the enclosure defining the first pressure chamber 146 and at least a portion of the bearing face of the cylinder cap 166, such that fluid in the first pressure chamber 146 bears thereagainst when pressurized. In the example illustrated, the outer diameter of the stationary part 174 is generally equal to the first bore diameter 170 of the casing 124, and generally all of the reactionary axial thrust generated when pressurizing the first pressure chamber 146 is borne by the stationary end face 176.

The cylinder cap 166 can include an optional second part (also called a rotary part) 180 affixed to the back end 164 of the casing 124 and rotating therewith. The rotary part 180 can be a generally annular element separately attached to the casing 124. In some examples, the rotary part 180 can comprise a portion of the casing 124 and be integral therewith.

The rotary part 180, in the example illustrated, has a generally cylindrical radially inner surface defining a rotary seal surface 182. The stationary part 174 can have a generally cylindrical radially outer surface defining a stationary seal surface 184. The stationary seal surface 184 is, in the example illustrated, received in sliding fit within the rotary seal surface 182. At least one seal can be disposed between, and in sealing engagement with, the rotary and stationary seal surfaces 182, 184 for providing a generally fluid-tight seal therebetween.

In some examples, the rotary part 180 can have an inner diameter that is less than the first bore diameter 170 of the cylindrical casing 124, providing an annular rotary end face directed towards the piston and against which fluid in the first pressure chamber 146 can bear when pressurized. The rotary end face can form a portion of the bearing face. Thus the bearing face can comprise at least a portion of stationary end face 176, and can comprise all of the stationary end face 176 and none, part, or all of the rotary end face. In examples where the cylinder cap 166 does not have a rotary part 180, or where the rotary part 180 is integral with the casing 124, the rotary seal surface 182 can be incorporated into an inner surface of the cylindrical casing 124. Having a separately attached rotary part 180 can simplify construction, and can facilitate servicing the unit (rotary part 180 can be replaced as a wear item, rather than replacing entire cylindrical casing 124).

Further details of the second pressure chamber 148 will now be described. In the example illustrated, the second pressure chamber 148 extends axially between a back wall 192 adjacent the first seal journal 144 and a front wall 194 adjacent the second seal journal 152. The second pressure chamber 148 extends radially between the outer surface 153 of the piston body 150 and a second inner surface 196 of a second portion 198 of the casing 124. This second inner surface 196 is engaged by the second seal journal 152 as the piston 126 moves between the advanced and retracted positions, and defines a second bore diameter 200 (FIG. 3).

The back wall 192 and front wall 194 of the second pressure chamber 148 are, in the example illustrated, each fixed relative to the piston body 150. The effective surface area of the back wall 192 is greater than the effective surface of the front wall 194, so that when the second pressure chamber 148 is pressurized with fluid, a net force is exerted urging the piston 126 towards the retracted position (towards the cylinder cap 166). In the example illustrated, the back wall 192 and the front wall 194 have a common inner radial extent defined by the outer surface 153 of the piston body 150. The back wall 192 has an outer radial extent generally equal to the first bore diameter 170, and the front wall 194 has an outer radial extent generally equal to the second bore diameter 200, and the first bore diameter 170 is greater than the second bore diameter 200.

In the example illustrated, the back wall 192 of the second pressure chamber 148 includes an annular portion of the front face 142 of the piston head 138 extending radially outwardly from the outer diameter of the piston body 150 to the inner surface of the first portion of the casing 124 (first bore diameter 170). The front wall 194 of the second pressure chamber 148 includes, in the example illustrated, an annular surface defined by a rearward shoulder of the seal journal 152 extending radially outwardly from the piston body 150 to the inner surface of the second portion of the casing 124 (second bore diameter 200). The first bore diameter 170 is greater than the second bore diameter 200, so that the radial extent and surface area of the back wall 192 is greater than that of the front wall 194 of the second pressure chamber 148.

The spline nut 156 is, in the example illustrated, positioned axially between the front and back walls 194, 192 of the second pressure chamber 148. The spline nut need not prevent axial fluid flow across the nut 156. For example, fluid can generally pass axially from one side of the nut 156 to the other by working its way between the internal and external spline profiles. Additionally or alternatively, axial flow passages can be provided in the spline nut 156 to facilitate flow of fluid through the nut 156. Operating in a fluid-filled environment can facilitate smooth and long-lasting operation of the spline nut 156 and piston body 150.

The injection unit 110 includes a first fluid port 202 for fluid communication with the first pressure chamber 146. In the example illustrated, the first fluid port 202 includes at least one first bore passing through the stationary part 174 of the cylinder cap 166. The at least one first bore is, in the example illustrated, radially offset from the axis 125 of the cylindrical casing 124.

The injection unit 110 includes a second fluid port 206 for fluid communication with the second pressure chamber 148. In the example illustrated, the second fluid port 206 includes a second bore passing through the stationary part 174 of the cylinder cap 166. The second bore is, in the example illustrated, coaxial with the axis 125 of the cylindrical casing 124. The injection unit has a suckback fluid passageway to provide fluid communication between the second fluid port 206 and the second pressure chamber 148. In the example illustrated, the suckback fluid passageway includes a fluid conduit 210 extending between the second port 206 and the piston 126 to provide fluid communication between the second port 206 and the front side 142 of the piston head 138. In the example illustrated, the fluid conduit 210 comprises a cylindrical tube coaxial with the axis 125 of the cylindrical casing 124, and extending through the first pressure chamber 146. The piston head 138 can have a through-hole 212 coaxial with the axis 125 extending from the rear face 140 to the front face 142 of the piston head 138. In some examples, at least a portion of the conduit 210 can be received in the through-hole 212.

The suckback fluid passageway can further include internal ducting in the piston body 150 to facilitate conveying fluid between the fluid conduit 210 and the second pressure chamber 148. In the example illustrated, the ducting includes a generally hollow interior cavity 214 in the piston body 150 and one or more outlet channels 216 extending between the interior cavity 214 and the outer surface 153 of the piston body 150. The outlet channels can open to the outer surface 153 of the body 150 between the first and second seal journals (i.e. between the back and front walls 192, 194 of the second pressure chamber 148).

In the example illustrated, the interior cavity 214 of the piston body 150 has a front wall 218 opposite the front face 142 of the piston head 138, and the outlet channels 216 can include front outlet channels 216*a* extending from the cavity 214 adjacent the front cavity wall 218, to the second pressure chamber 148 adjacent the front wall 194. The outlet channels 216 can further include rear outlet channels 216*b* extending from the interior cavity 214 adjacent the front face 142 of the piston head 138 to the second pressure chamber 148 adjacent the back wall 192. Fluid communication between the front and rear outlet channels 216*a*, 216*b* via the interior cavity 214 can further facilitate the flow of fluid across the spline nut 156 in the second pressure chamber 148.

In the example illustrated, the fluid conduit 210 is fixed in position relative to the cylinder cap 166 (non-translating and non-rotating relative to the cylinder cap 166). The piston head 138 rotates about the conduit 210 and translates axially relative to the conduit 210. The forward end of the conduit 210 is received within the internal cavity 214 when the piston 126 moves to the retracted position. In some examples the fluid conduit 210 can be fixed to the piston 126, for rotating and translating relative to the cylinder cap 166 but not relative to the piston 126.

In the example illustrated, the interface between the outer surface of the tube (conduit 210) the inner surface of the through-hole 212 in the piston head 138 can be sealed using suitable seals seated in the piston head 138. These seals would, in the example illustrated, seal against dual motion (both translation and rotation). The diameter of the seals (i.e. of the outer surface of the fluid conduit 210) is significantly less than the first bore diameter 170, and can be less than half the size of the first bore diameter 170. In the example illustrated, the outer surface of the fluid conduit 210 is less than one quarter the first bore diameter 170. The relatively small seal diameter can help to minimize friction and energy consumption associated with moving parts against the seal.

Referring again to FIG. 3, to provide fluid communication with the first and second ports 202, 206 a manifold member 220 can be affixed to the back portion 112*b* of the housing 112. In the example illustrated, the manifold member 220 comprises a first supply channel 222 and a second supply channel 226 integrally formed in the back portion 112*b* of the housing 112, for fluid communication with the first port and second port, respectively. In other examples, the first and second supply channels 222, 226 can be provided in a manifold body that is separately attachable to the housing 112.

In the example illustrated, the first supply channel 222 extends between the first fluid port 202 and a mounting surface upon which a valve can be mounted. The second supply channel 226 extends between the second fluid port 206 and the mounting surface. The manifold member 220 can further include a drain duct 228 extending through the stationary part 174 of the cylinder cap 166, between a drain inlet 228*a* and a drain outlet 228*b*. The drain inlet 228*a* can be positioned on the stationary seal surface 184 of the cylinder cap 166, axially rearwardly of at least one cap seal. The drain outlet 228*b* can open to an outer surface of the back portion 112*b* of the housing 112.

In use, to inject melt into the mold, the first pressure chamber is supplied with pressurized fluid via the first port. The pressurized fluid urges the piston towards the advanced position (to the left in FIG. 3). Fluid on the return side of the piston (i.e. in the second pressure chamber 148) can be displaced and evacuated via the conduit 210 and the second port 206. During filling of the mold, the injection screw 116 can remain in a fixed rotational position (in the example illustrated, the piston 126 translates but does not rotate during the mold filing stroke).

After filling the mold 140*a*, 106*a* the first pressure chamber 146 can remain pressurized to exert a holding pressure on the melt in the mold 104*a*, 106*a*.

Upon completion of the pressure holding phase, the second pressure chamber 148 can be pressurized to move the screw 116 away from the advanced position and towards the retracted position. The screw 116 can be moved only a short distance (for example, a few millimeters) away from the advanced position to reduce pressure at the nozzle, and prevent drooling of melt from the nozzle tip after the pressure holding phase. The second pressure chamber 148 can be pressurized by supplying pressurized fluid through the second port 206. Displaced fluid from the first pressure chamber 146 can be evacuated via the first port 202.

The plasticizing phase can commence for preparing the next shot of melt at the front of the screw. During plasticizing, the piston 126 can be rotated by energizing the rotary drive 130, which rotates the cylindrical casing 124 and spline bushing 156 affixed thereto, and which in turn rotates the piston 126 through engagement of the piston splines 154 by the spline bushing 156. As the injection screw 116 rotates, raw injection material is fed into the screw, and while being heated and worked by the screw 116, is urged to the shot cavity in front of the screw 116. As the volume of melt fills the melt cavity, the screw is pushed back away from the nozzle, which pushes the piston 126 further towards the retracted position. Evacuation of fluid from the first pressure chamber 146 during plasticizing can be controlled so that a desired back pressure is maintained in the first pressure chamber 146.

When the first pressure chamber 146 is pressurized, significant axial loads (i.e. thrust loads) can be exerted on the bearing face of the cylinder cap 166. According to the applicant's teaching disclosed herein, at least a portion of the thrust load acts on, and is taken up by, the stationary end face 176 of the cylinder cap 166. This portion of the thrust load is diverted away from the cylindrical casing 124 and the bearings 128, since the stationary part 174 (with stationary end face 176) is supported in position by a fixed connection to the stationary housing 112.

Reducing the thrust load on the casing 124 can facilitate providing the desired rotation of the cylinder casing 124 relative to the housing 112. In some examples, diverting a portion of the axial load can facilitate using smaller or less expensive bearings to support the rotation of the cylinder casing 124 relative to the housing 112, and/or can contribute to improved service life of the bearings.

Figure 7:
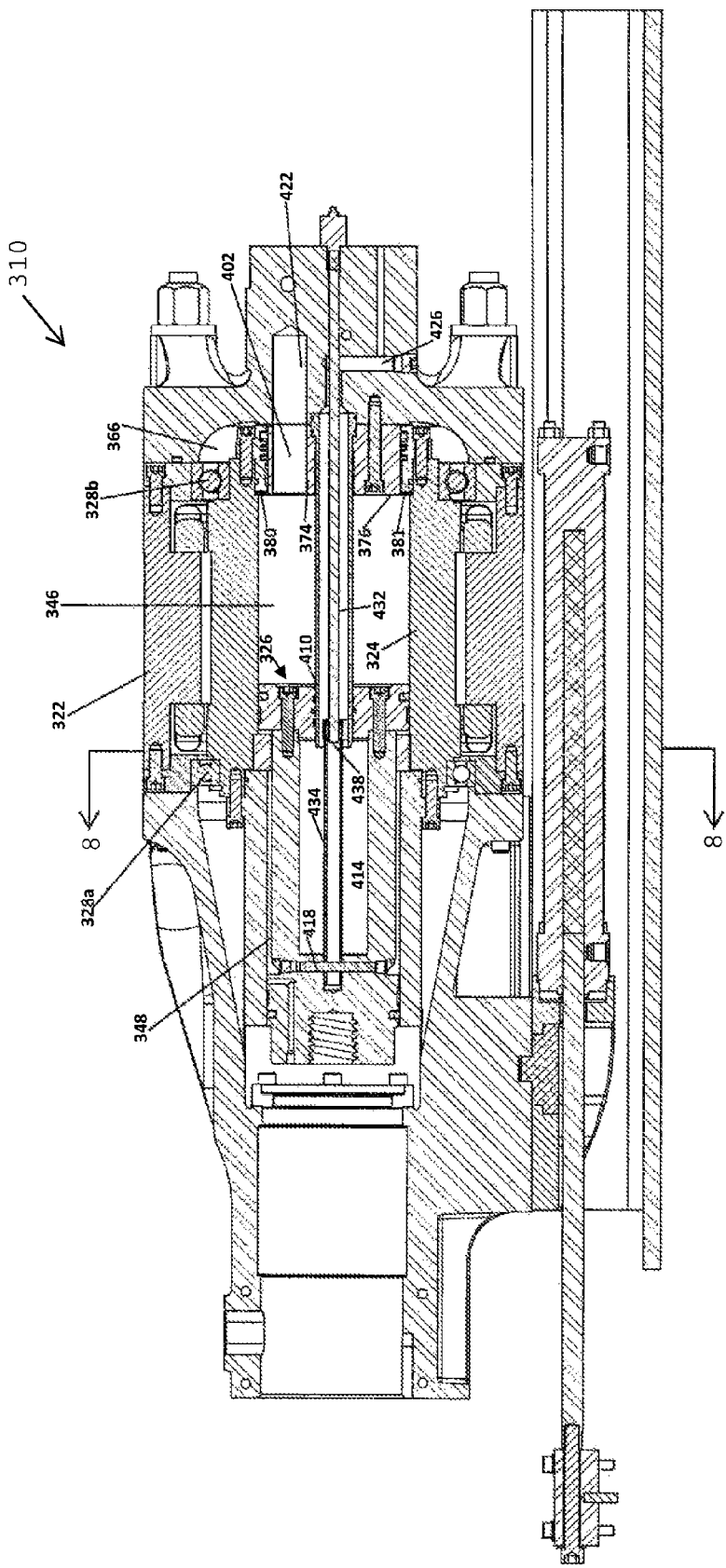
FIG. 7 is a cross-sectional view of another example of an injection unit.
Figure 8:
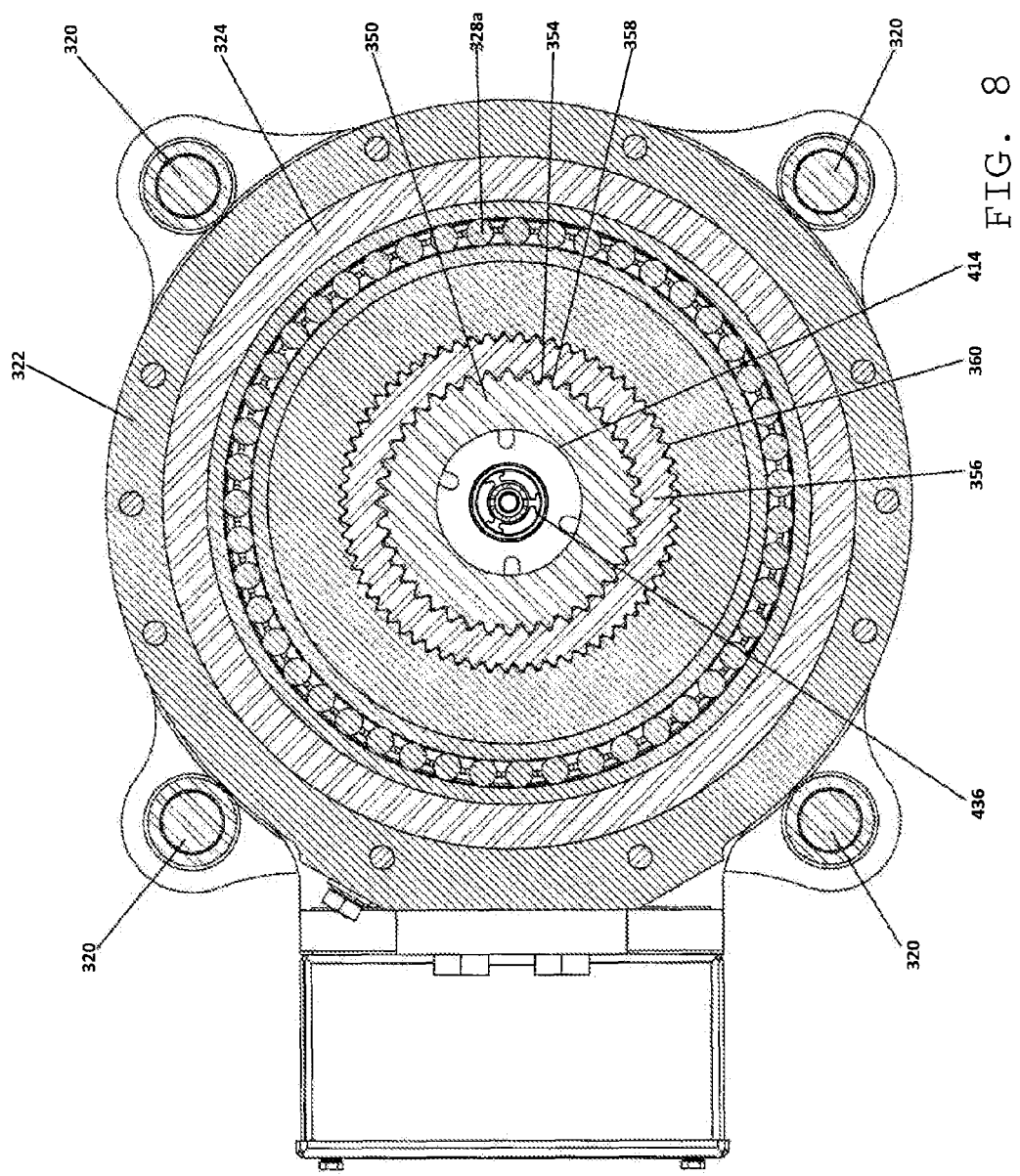
FIG. 8 is a cross-sectional view of the injection unit of FIG. 7.

Referring now to FIGS. 7 and 8, another example of an injection unit 310 is illustrated. The injection unit 310 has similarities to the injection unit 110, and like features are identified by like reference characters, incremented by 200.

The injection unit 310 has a rotary cylindrical casing 324 with one end generally closed off by a cylinder cap 366. The cylinder cap 366 has a stationary part 374 with a stationary end face 376 facing the cylinder 326. The cylinder cap 366 further includes a rotary part 380 having a rotary end face 381 facing the piston 326. Pressurized fluid in the first pressure chamber 346 bears against the stationary end face 376 and the rotary end face 381. The bearings 328 supporting the cylinder casing 324 within the stator 322 can include front bearing assembly 328a and rear bearing assembly 328b. One or both of the bearing assemblies 328a, 328b can be of a greater size (relative to examples of cylinder caps having no rotary end face, such as cylinder cap 166) to facilitate withstanding the axial thrust exerted on the rotary end face 381. In the example illustrated, the rear bearing assembly 328b has been enlarged or scaled-up to withstand higher axial thrust loads.

The injection unit 310 further includes provision for a linear position measuring device 432 for measuring the axial position of the piston 326 relative to the cylinder casing 324. In the example illustrated, the measuring device 432 includes a probe extending axially through the fluid conduit 410, from a front end generally adjacent the front end of the conduit 410, to a back end adjacent the cylinder cap 366. A sleeve 434 can be provided, extending from the front end of the conduit 410 to the front wall 418 of the hollow internal cavity 414 of the piston body 350 for telescopically receiving the probe when the piston 326 moves to the retracted position. A porous bushing 436 can be mounted to the back end of the sleeve 434 to facilitate holding the back end of the sleeve 434 against the outer surface of the probe, and to facilitate desired telescopic action of the sleeve 434 over the probe 432 and within the conduit 410. Fluid (oil) can flow relatively freely through the annular space between the outer surface of the sleeve 434 and the inner surface of the conduit 410 and through the bushing 438 for communication with the internal cavity 414 (see also FIG. 8). Fluid can also flow into the sleeve 434, and the sidewalls of the sleeve can be porous (provided with apertures, for example) to facilitate evacuation of fluid from within the sleeve 434 when receiving the probe therein (ie. when the piston 326 moves towards the advanced position).

The bushing 436 can be fixed to the back end of the sleeve 434, such that the bushing 434 moves with the piston 326 relative to the probe. A triggering element (such as, for example, a magnet) 438 can be fixed in the bushing to interact with the probe so that the axial position of the piston can accurately be detected.

Figure 9:
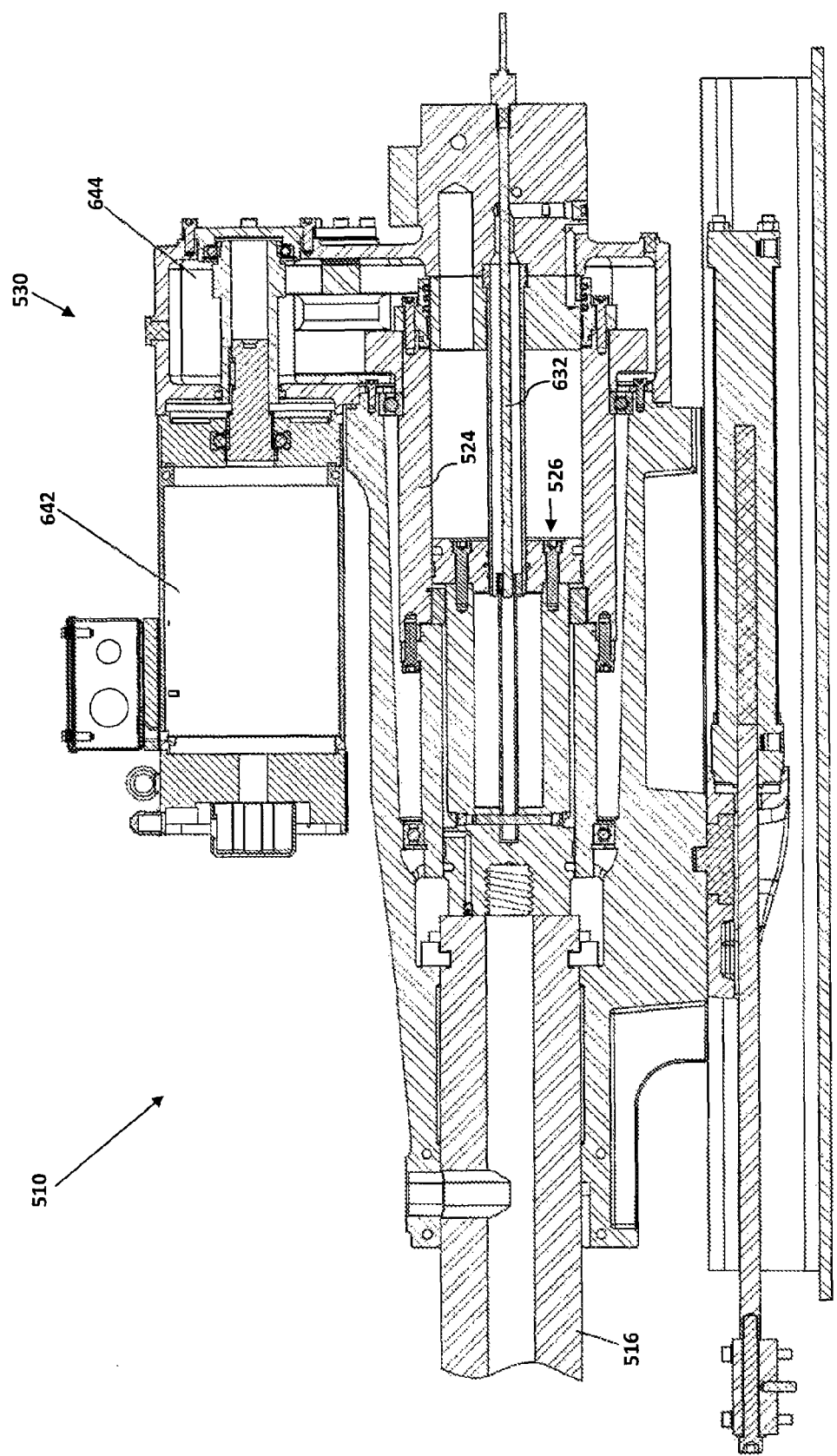
FIG. 9 is a cross-sectional view of another example of an injection unit.

Referring now to FIG. 9, another example of an injection unit 510 is illustrated. The injection unit 510 has similarities to the injection unit 110, and like features are identified by like reference characters, incremented by 400.

The injection unit 510 has a rotary drive 530 comprising a motor 642 coupled to the rotary cylinder casing 524 via a gear box 644. Using a gear box 644 can simplify construction of the cylinder casing 524 relative to examples where the cylinder casing forms the rotor of a hollow electric motor, such as casing 124. The motor 642 can in some cases be a standard motor, which can reduce cost and availability of the motors 642 and spare parts for the motors 642.

The injection unit 510 can also include the provision for a linear position measuring device 632 for measuring the axial position of the piston 526 relative to the cylinder casing 524. The linear position measuring device 632 and its associated components can be generally the same as those described with reference to the injection unit 310 (i.e. at reference characters 432-438).

Figure 10:
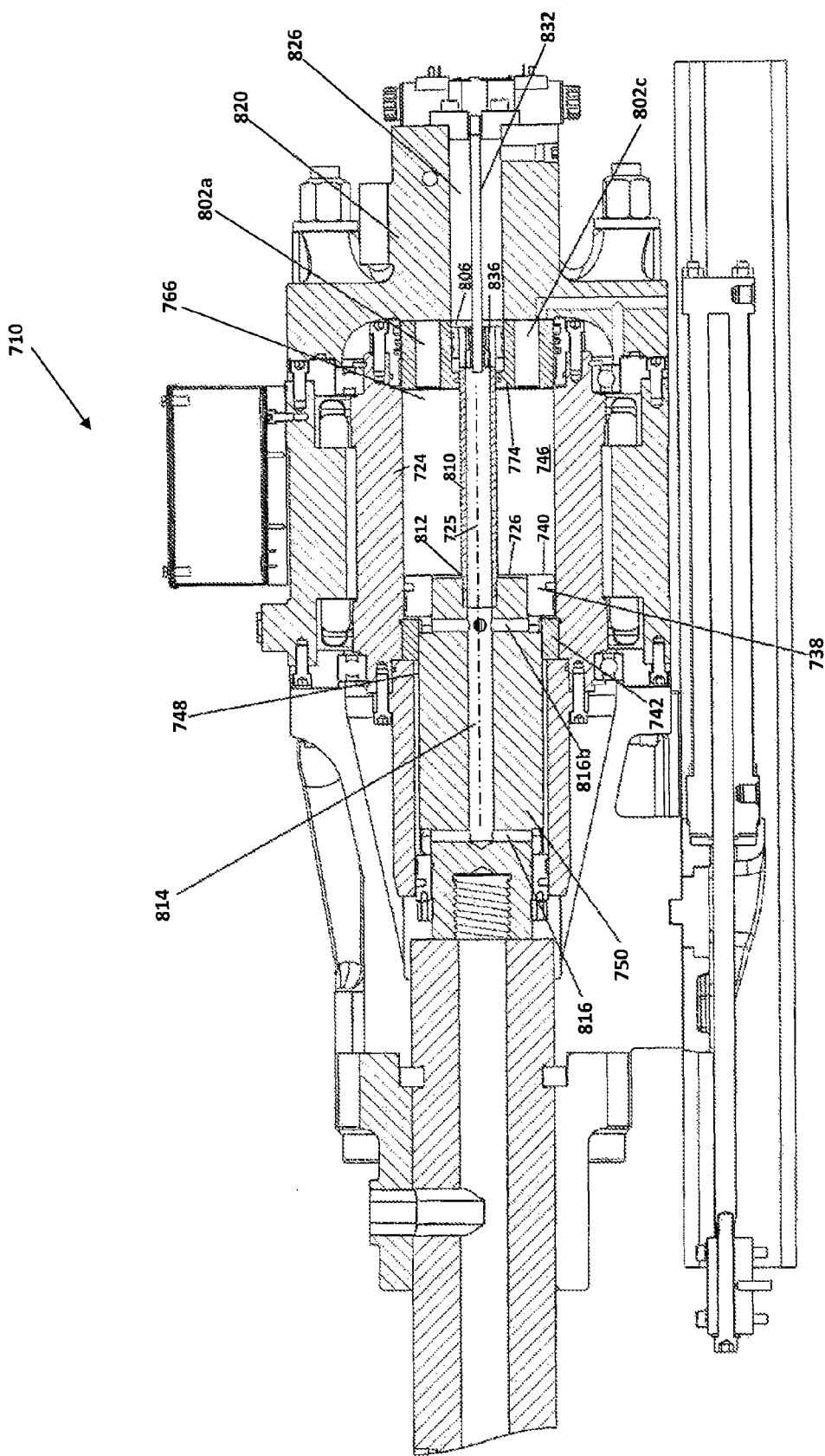
FIG. 10 is a cross-sectional view of another example of an injection unit.

Referring now to FIG. 10, another example of an injection unit 710 is illustrated. The injection unit 710 has similarities to the injection unit 110, and like features are identified by like reference characters, incremented by 600.

The injection unit 710 includes four first ports 802 each comprising a bore passing through the stationary part 774 of the cylinder cap 766, for fluid communication with the first pressure chamber 746. The first ports 802 are, in the example illustrated, spaced approximately equally apart around a circumference about the axis 725. Upper and lower first ports 802a and 802c can be seen in FIG. 10, at respective elevations above and below the axis 725.

The injection unit 710 includes a second fluid port 806 for fluid communication with the second pressure chamber 748. In the example illustrated, the second fluid port 806 includes a second bore passing through the stationary part 774 of the cylinder cap 766. The second bore is, in the example illustrated, coaxial with the axis 725 of the cylindrical casing 724.

A fluid conduit 810 extends between the second port 806 and the piston 726 to provide fluid communication between the second port 806 and the front side 742 of the piston head 738. In the example illustrated, the fluid conduit 810 comprises a cylindrical tube coaxial with the axis 725 of the cylindrical casing 724, and extending through the first pressure chamber 746. The piston head 738, which can include an integral rear portion of the piston body 750 and/or can include an annular member mounted to a rear portion of the piston body 750, can have a through-hole 812 coaxial with the axis 725 extending from the rear face 740 to an interior cavity 814 of the piston body 750. In some examples, the interior cavity can comprise a hollow bore concentric with the axis 725 and extending along at least a portion of the length of the piston body 750. The through hole 812 can, in some examples, comprise a rear portion of the interior cavity 814.

The fluid conduit 810 of the injection unit 710 can be fixed to the piston 726 so that it rotates and translates with the piston 726. In the example illustrated, the fluid conduit 810 has a front end fixed in at least a portion of the through-hole 812. The second port 806 of the cylinder cap 766 includes seals to provide a fluid tight seal between the inner surface of the second port 806 and the outer surface of the fluid conduit 810. The second supply channel 826 of the manifold member 820 can have an axial length sufficient to telescopically receive the length of the fluid conduit 810 as the piston 726 moves from the advanced position (shown in FIG. 10) towards the retracted position (i.e. rightwards, towards the cylinder cap 766).

The injection unit 710 can also include provision for a linear position measuring device 832 for measuring the axial position of the piston 726 relative to the cylinder casing 724. In the example illustrated, the measuring device 832 includes a probe extending axially through the second supply channel 826 of the manifold member 822, for telescopic reception within the fluid conduit 810 when the piston moves towards the retracted position. A porous bushing 836 can be mounted to the back end of the fluid conduit 810 to move axially with the piston/conduit assembly, relative to the probe. The busing can include a pick-up or triggering member (for example, a magnet) whose position along the probe can be sensed by the probe. The bushing 836 can facilitating holding the probe concentrically within the inner walls of the fluid conduit 810, while allowing fluid flow between the second supply channel 826 and the interior of the fluid conduit 810.

Figure 11:
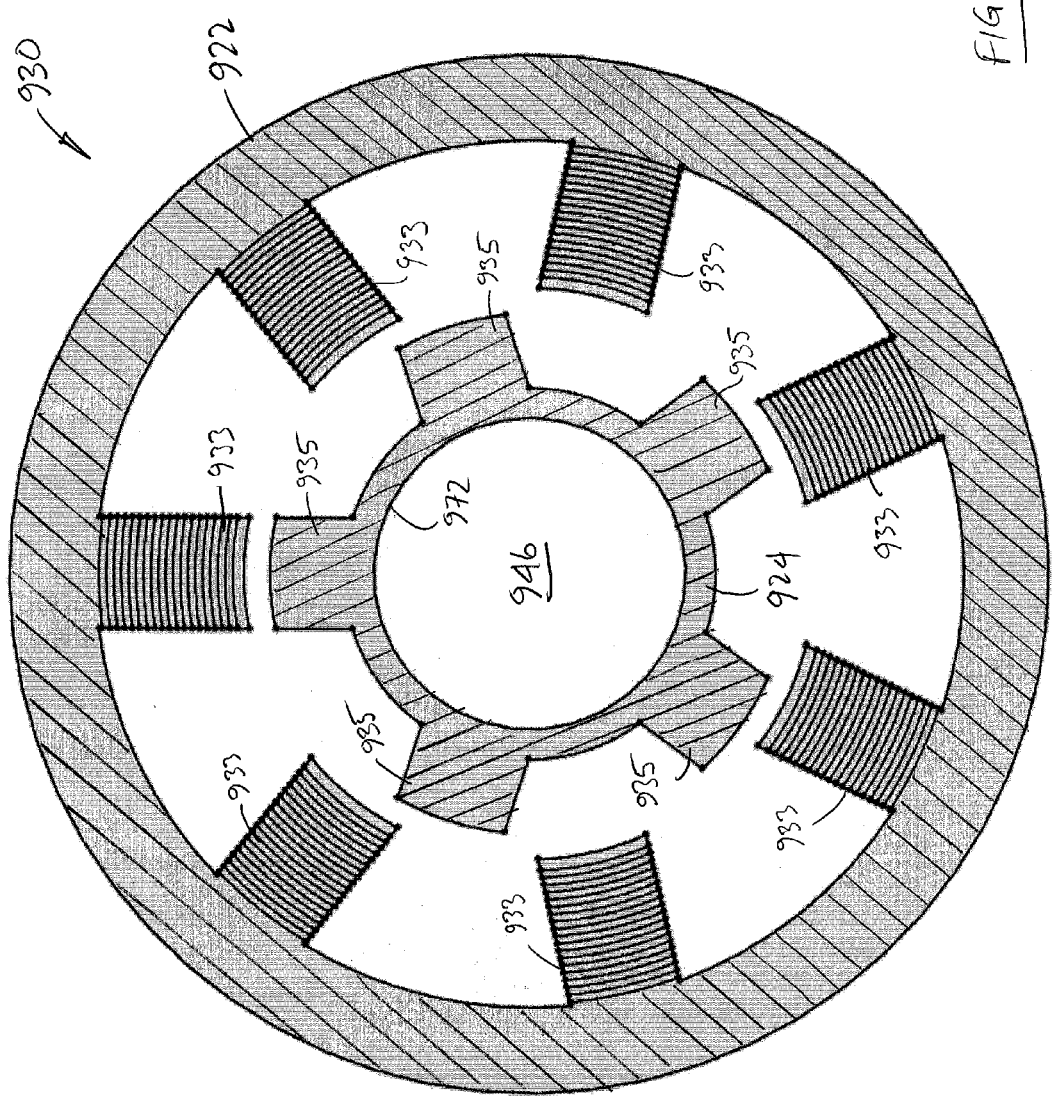
FIG. 11 is a cross-sectional view generally corresponding to FIG. 4 but of another example of an injection unit.

Referring to FIG. 11, another example of an injection unit 910 is illustrated. The injection unit 910 has similarities to the injection unit 110, and like features are identified by like reference characters, incremented by 800.

The injection unit 910 comprises a rotary drive in the form of a switched reluctance motor (SRM) 930. The SRM 930 may include stator components 932 affixed to the outer shell 922 of the housing 912 of the injection unit 910, and may include rotor components 934 affixed to the cylindrical casing 924. In the example illustrated, the stator components 932 comprise a plurality of stator poles 933 directed radially inwardly of the shell 922 of the housing 912, and the rotor components 934 comprise a plurality of rotor poles 935 directed radially outwardly of the cylindrical casing 924, towards the stator poles 933. The quantity of stator poles 933 may be greater than the quantity of rotor poles 935. In the example illustrated, the SRM 930 has seven stator poles 933 and five rotor poles 935.

Each stator pole 933 may comprise windings around a central core, the central core projecting radially inwardly and extending lengthwise along at least a portion of the casing 924. The cores of each stator pole may be integrally formed with the shell 922. Each stator pole may comprise windings wrapped around each core for inducing a magnetic force in the core when current is passed through the windings.

The casing 924 generally serves as the rotor of the SRM 930. The central portion of the rotor is, in the example illustrated, bored out to accommodate the piston 926 (a portion of which is shown at first pressure chamber 946). The first pressure chamber 946 has a first bore diameter generally defined by the inner surface 972 of the cylindrical casing 924. The SRM 930 can in this sense be considered a particular type of hollow electric motor.

The rotor (i.e. the casing 924) may be made of a magnetic material, such as, for example, an iron-cobalt alloy, and the rotor poles 935 may be integrally formed with the casing 924. The casing 924 may be free of any permanent magnets attached to its outer surface for interacting with the stator poles. This can eliminate concern regarding performance of permanent magnets in an oil-filled environment, and/or detachment of such magnets due, for example, to potential deformation of the casing as a result of repeated pressurizing and depressurizing of the interior chambers.

While the above description provides examples of one or more processes or apparatuses, it will be appreciated that other processes or apparatuses may be within the scope of the accompanying claims.

The invention claimed is:

1. An injection unit, comprising:
    a) a hollow cylindrical casing rotatably supported by a housing, the cylindrical casing having an axis and a front end and a back end spaced apart along the axis;
    b) a piston in the cylindrical casing, the piston axially slidable relative to the cylindrical casing along the axis between advanced and retracted positions, and the piston rotationally locked with the cylindrical casing to rotate therewith; and
    c) a cylinder cap generally closing off the back end of the cylindrical casing, a first pressure chamber provided between a first face of the piston and the cylinder cap, the cylinder cap including a stationary part affixed to the housing and a rotary part affixed to the cylindrical casing, at least the stationary part providing a stationary end face opposed to the piston and against which fluid in the first pressure chamber bears when pressurized.

2. The injection unit of claim 1, wherein the stationary part is separately attachable to the housing.

3. The injection unit of claim 1, wherein the rotary part is separately attachable to the cylindrical casing.

4. The injection unit of claim 1, wherein the rotary part has a central opening therethrough, the opening defined by a generally cylindrical radially inner surface of the rotary part that is coaxial with the axis of the casing and comprises a rotary seal surface, the stationary part having a generally cylindrical radially outer surface defining a stationary seal surface, and wherein the stationary seal surface is received in sliding fit within the rotary seal surface.

5. The injection unit of claim 1, further comprising a first flow port in the cylinder cap for fluid flow into and out of the first pressure chamber, the first flow port disposed in the stationary part of the cylinder cap.

6. The injection unit of claim 1, further comprising bearings mounted between the housing and the cylindrical casing.

7. The injection unit of claim 6, wherein at least a portion of the axial force of pressure in chamber is transferred to the housing through the stationary part of the cylinder cap without passing through the bearings.

8. The injection unit of claim 7, wherein the piston is rotationally locked to the cylindrical casing to rotate with the cylindrical casing when in and moving between the advanced and retracted positions.

9. The injection unit of claim 1, further comprising a second pressure chamber acting against a second face of the piston, opposite the first chamber, and a suckback fluid passageway providing fluid communication between a second port in the cylinder cap and the second pressure chamber, the suckback fluid passageway including a fluid conduit extending between the second port and the piston.

10. The injection unit of claim 9, wherein at least a portion of the fluid conduit extends through the first pressure chamber.

11. The injection unit of claim 10, wherein the piston rotates and translates relative to the fluid conduit.

12. An injection unit, comprising:
   a) a hollow cylindrical casing rotatably supported by a housing, the cylindrical casing having an axis and a front end and a back end spaced apart along the axis;
   b) a piston in the cylindrical casing, the piston axially slidable relative to the cylindrical casing along the axis between advanced and retracted positions; and
   c) a cylinder cap having a bearing face generally closing off the back end of the hollow cylindrical casing and facing the piston, the hollow cylindrical casing having a first pressure chamber between the piston and the bearing face, the bearing face including at least a stationary face portion affixed to the housing and against which fluid in the first pressure chamber bears, the hollow cylindrical casing rotatable about the axis relative to the housing and the stationary face portion of the bearing face.

13. The injection unit of claim 12, wherein the cylinder cap comprises a stationary part affixed to the housing, the stationary part having a stationary end face directed towards the piston, and wherein the stationary face portion of the bearing face comprises the stationary end face.

14. An actuator for an injection unit of an injection molding machine, comprising:
   a) a cylinder including a hollow cylindrical casing having a cylinder axis, and a cylinder cap generally closing off one end of the cylindrical casing;
   b) a piston translatable within the cylinder along the cylinder axis between advanced and retracted positions, at least the piston being rotatable about the cylinder axis;
   c) the cylinder comprising a first pressure chamber on a first side of the piston facing the cylinder cap for urging the piston in a first direction when pressurized, and the cylinder comprising a second pressure chamber on a second side of the piston opposite the first side for urging the piston in a second direction when pressurized, the second direction opposite the first direction; and
   d) a fluid conduit extending between the cylinder cap and the piston and generally through the first pressure chamber for fluid communication with the second pressure chamber,
   wherein the fluid conduit comprises a generally cylindrical tube coaxial with the cylinder axis,
   and wherein the cylindrical casing is rotationally locked with the piston and rotates about the cylinder axis with the piston.

15. An injection unit for an injection molding machine, comprising:
   a) a hollow cylindrical casing rotatably supported by a housing, the cylindrical casing having an axis and a front end and a back end spaced apart along the axis;
   b) a piston in the cylindrical casing, the piston axially slidable relative to the cylindrical casing along the axis between advanced and retracted positions, and the piston rotationally locked with the cylindrical casing to rotate therewith; and
   c) rotor components affixed to the cylindrical casing so that the cylindrical casing is the rotor of a hollow electric motor.

16. The injection unit of claim 15, wherein the rotor components comprise magnets affixed adjacent an outer surface of the cylindrical casing.

17. The injection unit of claim 16, further comprising stator components affixed to the housing so that the housing is the stator of the hollow electric motor.

18. The injection unit of claim 17, wherein the stator components comprise motor windings mounted to the housing about an outer surface of the rotor.

\* \* \* \* \*